(12) United States Patent
Kozitsyn et al.

(10) Patent No.: US 9,110,556 B2
(45) Date of Patent: Aug. 18, 2015

(54) METHOD AND APPARATUS FOR INCREASING THE FUNCTIONALITY OF AN ELECTRONIC DEVICE IN A LOCKED STATE

(75) Inventors: Oleg Kozitsyn, Tampere (FI); Mikko Antero Nurmi, Tampere, FL (US)

(73) Assignee: Nokia Technologies Oy, Espoo (FI)

( * ) Notice: Subject to any disclaimer, the term of this patent is extended or adjusted under 35 U.S.C. 154(b) by 262 days.

(21) Appl. No.: 13/453,586

(22) Filed: Apr. 23, 2012

(65) Prior Publication Data

US 2012/0278744 A1 Nov. 1, 2012

Related U.S. Application Data

(60) Provisional application No. 61/480,223, filed on Apr. 28, 2011.

(51) Int. Cl.
| | | |
|---|---|---|
| G06F 3/0481 | (2013.01) | |
| G06F 3/01 | (2006.01) | |
| G06F 3/0484 | (2013.01) | |

(52) U.S. Cl.
CPC .............. *G06F 3/0481* (2013.01); *G06F 3/011* (2013.01); *G06F 3/017* (2013.01); *G06F 3/0484* (2013.01)

(58) Field of Classification Search
CPC . G06F 3/0482; G06F 3/0488; G06F 3/04817; G06F 1/32; G06F 3/017; G06F 3/011; G06F 3/0484
See application file for complete search history.

(56) References Cited

U.S. PATENT DOCUMENTS

| | | | |
|---|---|---|---|
| 2005/0064911 A1* | 3/2005 | Chen et al. ..................... | 455/566 |
| 2005/0210417 A1* | 9/2005 | Marvit et al. .................. | 715/863 |
| 2009/0102859 A1* | 4/2009 | Athsani et al. ................ | 345/619 |
| 2010/0269040 A1 | 10/2010 | Lee | |
| 2011/0047368 A1* | 2/2011 | Sundaramurthy et al. ..... | 713/100 |
| 2011/0283241 A1* | 11/2011 | Miller et al. .................. | 715/863 |

FOREIGN PATENT DOCUMENTS

EP     2 306 262 A1     4/2011

OTHER PUBLICATIONS

International Search Report for PCT/FI2012/050416 dated Oct. 29, 2012, pp. 1-5.
Written Opinion for PCT/FI2012/050416 dated Oct. 29, 2012, pp. 1-9.

* cited by examiner

*Primary Examiner* — Claudia Dragoescu
(74) *Attorney, Agent, or Firm* — Ditthavong & Steiner, P.C.

(57) ABSTRACT

An approach is provided for increasing the functionality of an electronic device when the device is in a locked state. The approach involves determining one or more applications for presentation at a device. The approach also involves determining that the device is in a locked state. The approach further involves processing and/or facilitating a processing of the one or more applications to cause, at least in part, presentation of the one or more applications in a user interface of the device associated with the locked state.

20 Claims, 8 Drawing Sheets

METHOD AND APPARATUS FOR INCREASING THE FUNCTIONALITY OF AN ELECTRONIC DEVICE IN A LOCKED STATE

RELATED APPLICATIONS

This application claims the benefit of the earlier filing date under 35 U.S.C. §119(e) of U.S. Provisional Application Ser. No. 61/480,223 filed Apr. 28, 2011, entitled "Method and Apparatus for Increasing the Functionality of an Electronic Device in a Locked State," the entirety of which is incorporated herein by reference.

BACKGROUND

Service providers and device manufacturers (e.g., wireless, cellular, etc.) are continually challenged to deliver value and convenience to consumers by, for example, providing compelling network services. The spread of augmented reality and other application usage on electronic devices increases the importance of providing a fast way to access such applications. Electronic devices, such as those with touch screens, have a lock screen feature to avoid any accidental functioning of the electronic device. The lock screen, however, increases the amount of time required to access and use an application that is run on the electronic device. There is a need, therefore, to increase the functionality of the electronic device while it is in a locked state.

Some Example Embodiments

Therefore, there is a need for an approach for increasing the functionality of an electronic device while the device is in a locked state.

According to one embodiment, a method comprises determining one or more applications for presentation at a device. The method also comprises determining that the device is in a locked state. The method further comprises processing and/or facilitating a processing of the one or more applications to cause, at least in part, presentation of the one or more applications in a user interface of the device associated with the locked state.

According to another embodiment, an apparatus comprises at least one processor, and at least one memory including computer program code, the at least one memory and the computer program code configured to, with the at least one processor, cause, at least in part, the apparatus to determine one or more applications for presentation at a device. The apparatus is also caused to determine that the device is in a locked state. The apparatus is further caused to process and/or facilitate a processing of the one or more applications to cause, at least in part, presentation of the one or more applications in a user interface of the device associated with the locked state.

According to another embodiment, a computer-readable storage medium carries one or more sequences of one or more instructions which, when executed by one or more processors, cause, at least in part, an apparatus to determine one or more applications for presentation at a device. The apparatus is also caused to determine that the device is in a locked state. The apparatus is further caused to process and/or facilitate a processing of the one or more applications to cause, at least in part, presentation of the one or more applications in a user interface of the device associated with the locked state.

According to another embodiment, an apparatus comprises means for determining one or more applications for presentation at a device. The apparatus also comprises means for determining that the device is in a locked state. The apparatus further comprises means for processing and/or facilitating a processing of the one or more applications to cause, at least in part, presentation of the one or more applications in a user interface of the device associated with the locked state.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for increasing the functionality of an electronic device while the device is in a locked state are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
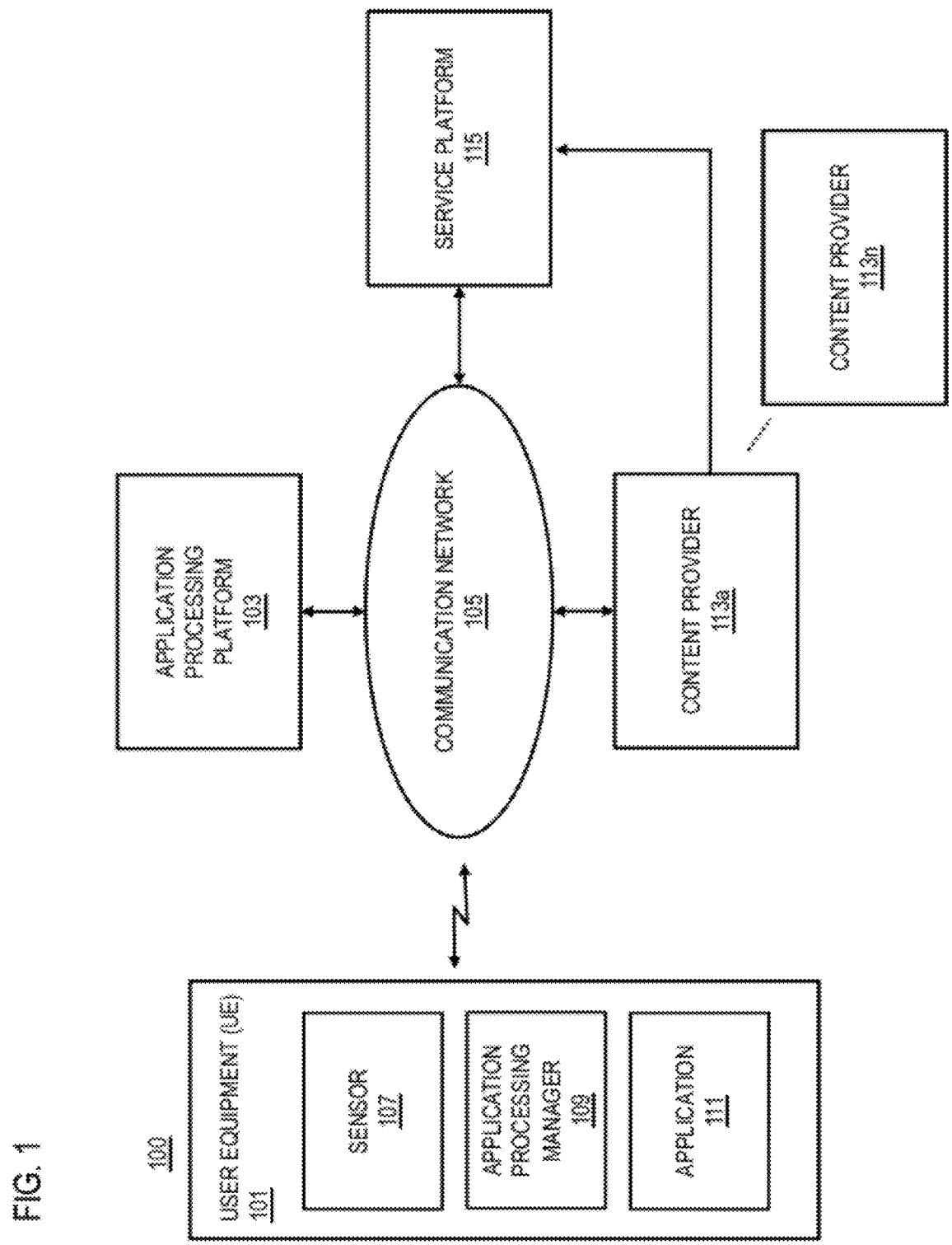
FIG. 1 is a diagram of a system capable of increasing the functionality of an electronic device while the device is in a locked state, according to one embodiment.

FIG. 1 is a diagram of a system capable of increase the functionality of an electronic device while the device is in a locked state, according to one embodiment. The spread of augmented reality (AR) and other application usage on electronic devices increases the importance of providing a fast way to access such applications. Electronic devices, such as those with touch screens, have a lock screen feature to avoid any accidental functioning of the electronic device. The lock screen, however, increases the amount of time required to access and use an application that is run on the electronic device. There is a need, therefore, to increase the functionality of the electronic device while it is in a locked state. Quite often a user needs to quickly check up on a current situation in an augmented reality on the run.

Because many mobile devices require a user to unlock the device before accessing any applications, a number of steps must be followed before, during, and after use of the application. Such a number of steps can be a detriment to the user because it is inconvenient and requires excess time. For example, steps that a user must take for using an augmented reality application with most mobile devices are as follows: get the device from the user's pocket, unlock the device, find the AR-app, start the AR-app, the app shows the last selected AR-layer with landmarks, find the nearest landmark by pointing and looking through the AR-view, lock the device, put the device back into the user's pocket.

Such a procedure of steps may occur in any situation, but a user, for example, may be on vacation and want information immediately without having to bother with so many steps to get that information. For instance, a user that is on vacation arrives in an unfamiliar city and wants to walk around with occasional visits to landmarks nearby. The user may have an AR-app installed on his phone and the necessary AR-layer with the city's landmarks may be downloaded into the app.

To address this problem, a system 100 of FIG. 1 introduces the capability to have functionality of particular applications when a device is locked. It would be advantageous to add a functional AR-view to a mobile device while the device is in its lock screen that is available by pressing, e. g., a power button (on the most devices power button lights up the screen, but doesn't unlock it). The user, in this case, could then quickly bring the necessary AR-layer to the lock screen just by pressing the power button, check the AR-environment and then turn off the display by pressing the power button again.

To prevent battery drain, mobile device could be in a low-power mode that displays a simplified AR-information display and a rendered street view (which does not require activating an onboard camera). Another way to prevent battery drain would be the short use of camera/light/proximity sensors to detect whether the phone is outside of a pocket, bag or case.

A proposed solution allows for a reduction in the number of steps necessary to access AR-layer. For example, steps of AR-app usage with lock screen integration such as that discussed above may be as follows: get the device from the user's pocket, press the power button, the device shows on the lock screen the last selected AR-layer with landmarks, find the nearest landmark by pointing and looking through the AR-view, press the power button again to turn off the screen, put the device back into the user's pocket. In this example, the AR application is always running and accessible without having to unlock the phone, search for the application, access the application and run the application. Such an implementation may require close integration between a device's software and an AR-app because lock screen content and behavior is usually completely controlled by the device's resident operating system. Such may be done by enabling an operating system provided application programming interface to access lock screen rendering and functionality.

Alternatively, or in addition, to using the power button to activate functionality of the AR-app when the device is in a locked state, an orientation sensor can be used to manipulate the kind of data that is shown when the device is in a locked state. By turning the device, for example, vertically or horizontally the user can change the locked state view without unlocking the phone, touching the display or pressing a button, for example. Existing devices merely change the data to shown in a locked state by way of a lock bars. The difference is that the related idea focuses on lock bar usage. This solution uses only screen orientation.

Orientation sensors exist in many phones, and the orientation sensors control the orientation and alignment of display on a device. However, the lock screen content and behavior are usually completely controlled by the phone OS. Therefore, the implementation may require OS-provided API to access lock screen rendering and functionality as well as access to screen orientation sensor.

Usage of the orientation sensors may not be limited to solely switching between two views (horizontal and vertical). Rather, usage of the orientation sensor to may also be used for switching between multiple views by continuously rotating the screen clockwise or counter clockwise (e.g. a calendar view while holding device vertically can be switched to an inbox view by rotating the device clockwise into horizontal position, and then switched to a to-do-list by further rotating the device clockwise into a vertical position).

As shown in FIG. 1, the system 100 comprises a user equipment (UE) 101 having connectivity to an application processing platform 103, content providers 113a-113n (collectively referred to as content provider 113, and a service platform 115 via a communication network 105. In one embodiment, the UE 101 has sensors 107 the detect context information about the location of the UE 101 and/or orientation information about the UE 101. The UE 101 may be in a locked state, and once a display is activated, the UE 101 displays an application 111 such as an augmented reality application that may be one of many applications in the locked state. The UE 101 may switch between applications 111 and/or alternative views based on a movement of the UE 101 that is detected by the sensors 107. The application processing platform 103 may be resident within the UE 101 or external to the UE 101 and/or the functionality of the application processing platform 103 may be replaced or shared by an application processing manager 109 that is resident within the UE 101. For simplicity, the application processing manager 109 will be described in the context of the application processing platform 103, herein. The application processing platform 103 may determine whether a switch or a button of the UE 101 has been actuated, whether a standard power mode or a low power mode should be activated on the UE 101 for running an application in the locked state, and process any context information that the processing platform 103 may receive by way of the sensors 107, for example.

In certain embodiments, the UE 101 may be running an application in a locked state, and the application may have multiple views or user interfaces available. A user may switch between views or user interfaces by interacting with the UE 101 by changing its orientation. For example, a user may view a horizontal view on the application, and by turning the UE 101 90 degrees in a clockwise direction, the view may change to a vertical view. The vertical view may be a different view of the same display, another user interface that is available for the application, or another application all together. In another example, the horizontal view could be an inbox for a messaging application, and the vertical view could be a calendar. The user may also continue turning the orientation of the UE 101 to change the view again, or return the view to its original interface.

In certain embodiments, the UE 101 may be running an application in a locked state and, as discussed above, the application may have multiple views or user interfaces available. The user, in this embodiment, which may be separate or in addition to the above embodiment, may switch between views, user interfaces, or applications by actuating a switch that is part of the UE 101. For example, the user may hit a power button on the UE 101 to activate a display, and may then hit the power button again, or a volume button to change the view in the manner discussed above.

In certain embodiments, the UE 101 may be running an augmented reality application 111 that displays information based on context information about the UE 101. The content for the application 111 may be provided by the content provider 113 and/or the service platform 115. Such content may be any information that is desired about a location or point of interest, for example. The content that may be provided may be map related information and/or imagery, historical data, address information, contact information, encyclopedia information, vacancy information, menu information, reservation related information, etc. The context information may be received by the sensors 107 and processed by the application processing platform 103. The information that is displayed may relate to location information and context related to the location information. For example, the user may view an augmented reality on the UE 101's current or hypothetical location, and in the display of the augmented reality view information about landmarks, restaurants, transportation information, etc. In this embodiment, the user may change the view by turning the device as described above, of by simply moving the device toward an object. Such a movement may also result in zooming a display that is shown by the UE 101.

In certain embodiments, the application may be an augmented reality, but a low-power mode is desired to save battery life of the UE 101. In the low-power mode, the user may view a wireframe or a rendered view that is saved on the UE 101 rather than viewing a live display by way of a camera that is part of the UE 101. By not requiring the camera to produce the view displayed on the UE 101, the camera need not be activated, and power may be saved.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the sensors 107 may be any of a camera, an orientation sensor, a movement sensor, a location sensor, a proximity sensor, a light sensor and the like.

By way of example, the UE 101, the application processing platform 103, the content provider 113; and services platform 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
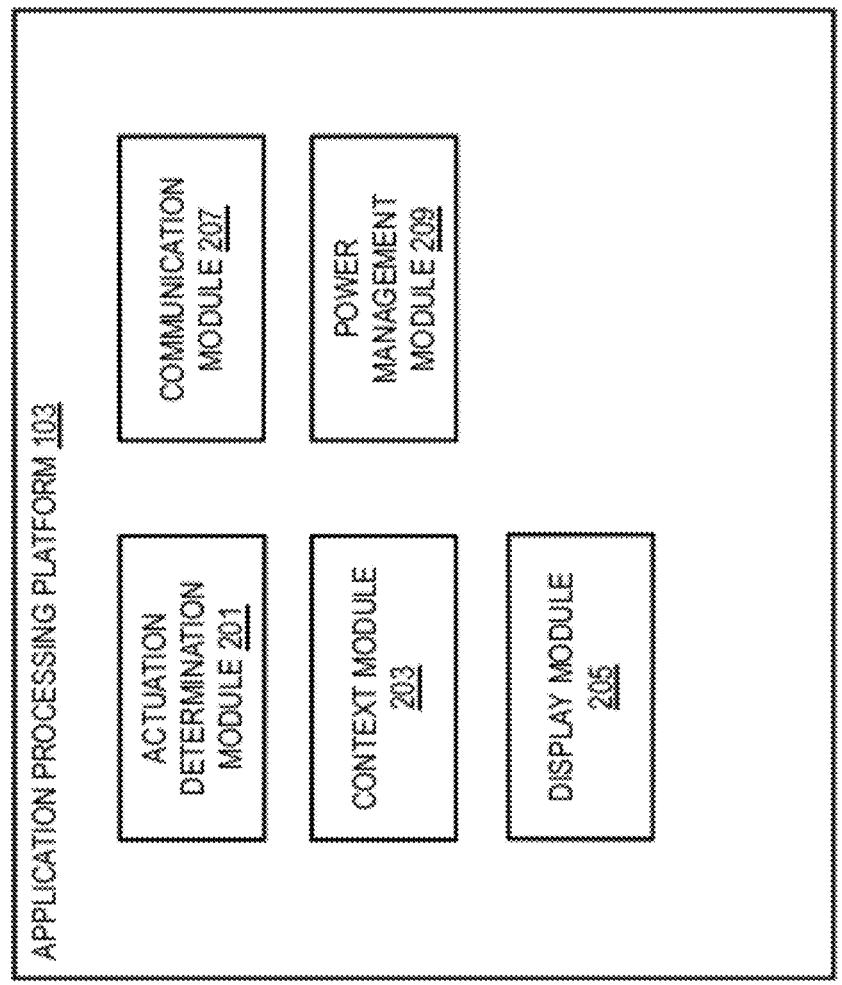
FIG. 2 is a diagram of the components of an application processing platform, according to one embodiment.

FIG. 2 is a diagram of the components of the application processing platform 103 according to one embodiment. By way of example, the application processing platform 103 includes one or more components for increasing the functionality of an electronic device while the device is in a locked state. It is contemplated that the functions of these components may be combined in one or more components or performed by other components of equivalent functionality. In this embodiment, the application processing platform 103 includes an actuation determination module 201, a context module 203, a display module 205, a communication module 207, and a power management module 209.

In one embodiment, the actuation determination module 201 determines whether a user has manipulated the UE 101 in any way that may be detected by the sensors 107 or any buttons such as a power button of the UE 101. The manipulation may be a movement of the device or the actuation of a switch or button. The manipulation allows for the user to direct a manipulation of the application to switch between one application and another, or to switch between views and/or user interfaces of the application. The context module 203 receives context information by way of the communication module 207 about the UE 101 that may be detected by the sensors 107. A user profile may also be resident on the UE 101 or receivable from another network entity that communicates with the application processing platform 103. The context information that is received may be processed by the context module 203 to determine locations of interest to a user of the UE 101 such as landmarks, restaurants, bars, transportation information, hotels, etc. The display module 205 determines what information is to be displayed, and based on the determination made by the actuation determination module 201, determines which user interface or view of the application or other applications is to be displayed.

The power management module 209 determines whether a low-power mode or a standard power mode is to be used by the UE 101 for displaying the application in the locked state. The low-power mode may be any of a wireframe display, reduced rendering, a reduction of the complexity of one or more views of one or more applications, and/or deactivation of one or more components of the UE 101 or the application.

Any processing that is done by the application processing platform 103 may be output by the communication module 207 to the UE 101 for display.

Figure 3:
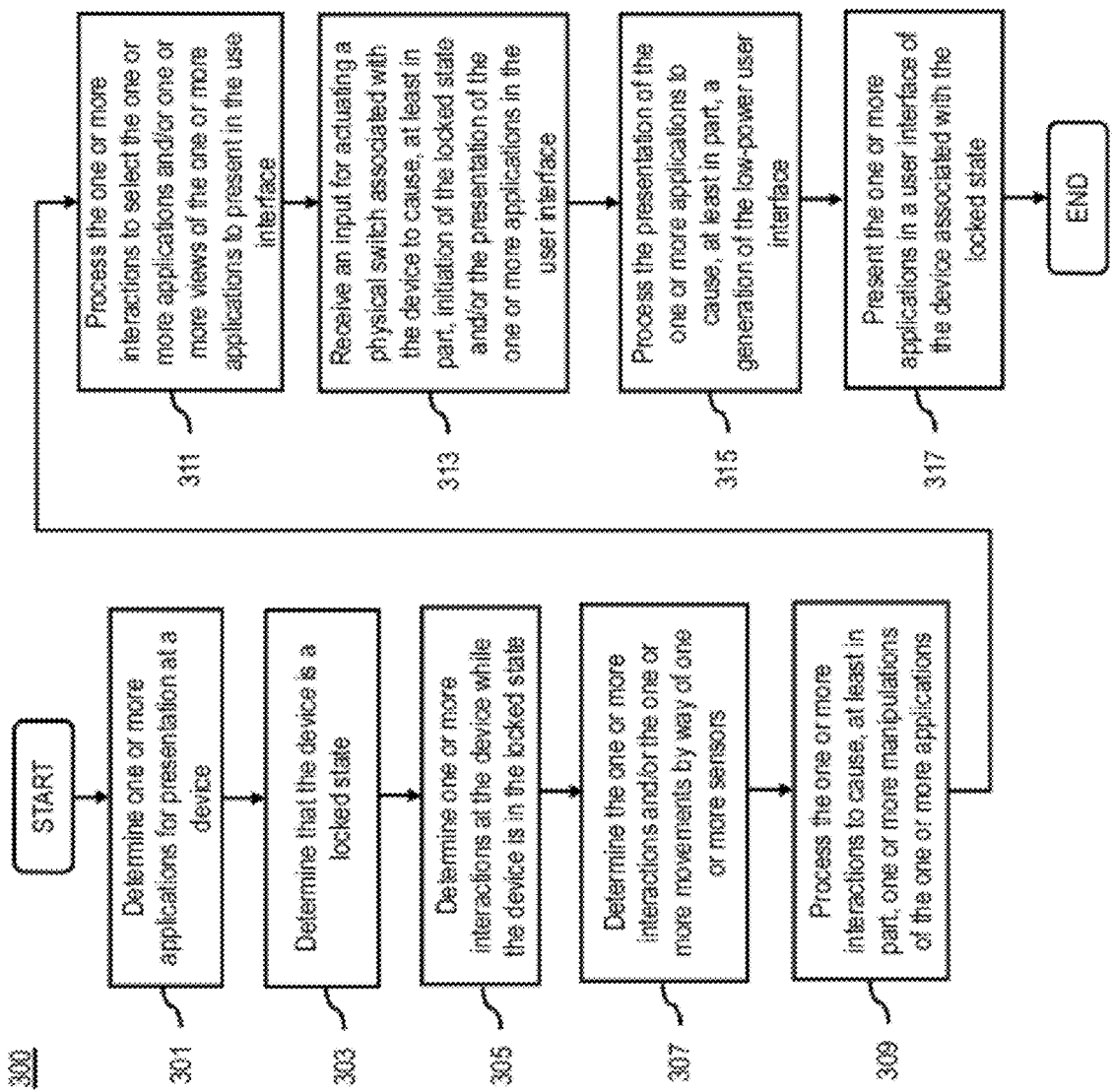
FIG. 3 is a flowchart of a process for increasing the functionality of an electronic device while the device is in a locked state, according to one embodiment.
Figure 7:
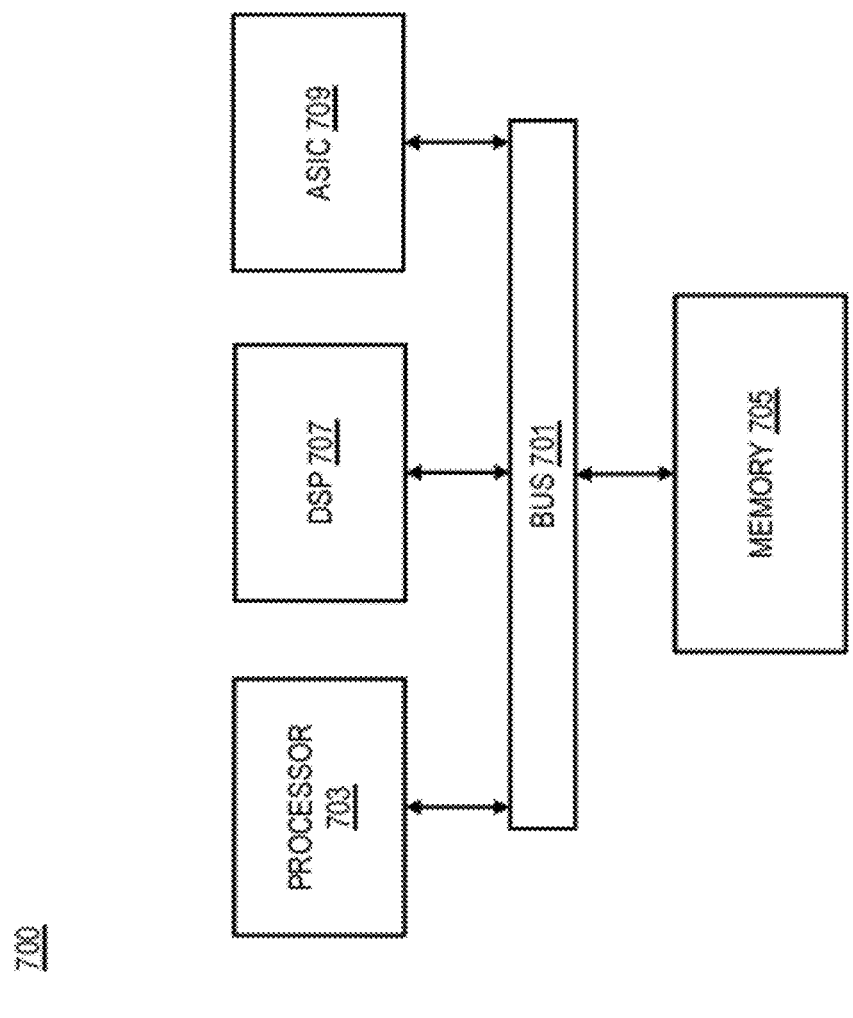
FIG. 7 is a diagram of a chip set that can be used to implement an embodiment of the invention.

FIG. 3 is a flowchart of a process for increasing the functionality of an electronic device while the device is in a locked state according to one embodiment. In one embodiment, the application processing platform 103 performs the process 300 and is implemented in, for instance, a chip set including a processor and a memory as shown in FIG. 7. In step 301, the application processing platform 103 determines one or more applications that are to be presented at a device. The one or more applications may be any of an augmented reality, mapping application, navigation application, messaging application, calendar application, mixed reality application, and the like. The process continues to step 303 in which the application processing platform 103 determines that the device is in a locked state. Next, in step 305, the application processing platform determines one or more interactions with the devices while the device is in the locked state. Such interactions may be by way of movements or actuation of switches or buttons that are integrated into the device. The process continues to step 307 in which the application processing platform 103 determines the one or more interaction and/or the one or more movements by way of one or more sensors. Such sensors may be the sensors 107 discussed above, for example. Next, in step 309, the application processing platform 103 processes the one or more interactions to cause one or more manipulations of the one or more applications. For example, the one or more interactions may cause the view of an application to change, or the application to change to another application all together based on the interaction. Next, in step 311, the application processing platform processes the one or more interactions to select the one or more applications and/or one or more views of the one or more applications to present in the user interface. The process continues to step 313 in which the application processing platform 103 receives an input for actuating a switch associated with the device to cause, at least in part, initiation of the locked state and/or presentation of the one or more applications in the user interface. In an example embodiment, the switch may be a physical or mechanical switch, or the switch may be operable based on various sensors, e.g. a touch-sensitive switch or a switch operable based on detected gestures (e.g. optical sensor detecting the gestures). For example, if a device is in a locked state, the power button may be used to activate the display. But, once the display is activated, the power button may be used to interact with an application that is running while the device is in the locked state, and/or the power button, or any other button for that matter, may be used to return the device to a display off state, for example.

Next, in step 315, the application processing platform 103 processes the presentation of the one or more applications to determine whether the presentation should be in a low-power mode. If the determination is positive, the application processing platform 103 generates a low-power user interface. The low-power user interface may be any of a reduction of the complexity of one or more views of the one or more applications and/or a deactivation of one or more components of the one or more applications, for example. The process continues to step 317 in which the application processing platform 103 causes the presentation of the one or more applications in a user interface of the device when the device is in a locked state.

Figure 4B:
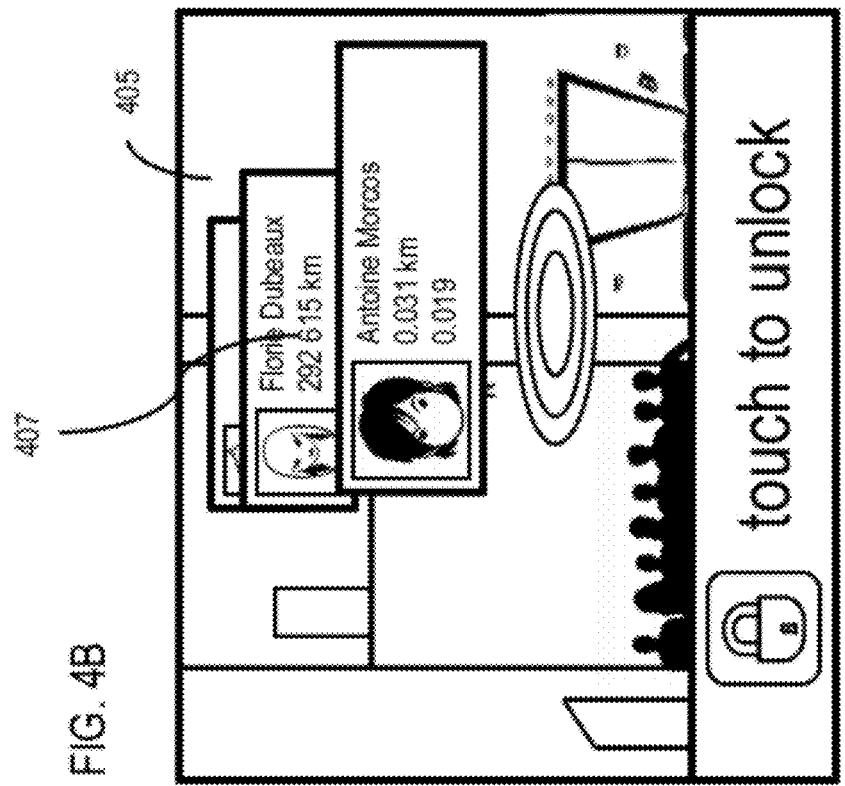
FIGS. 4A and 4B are diagrams of user interfaces utilized in the processes of FIG. 3, according to various embodiments.
Figure 4A:
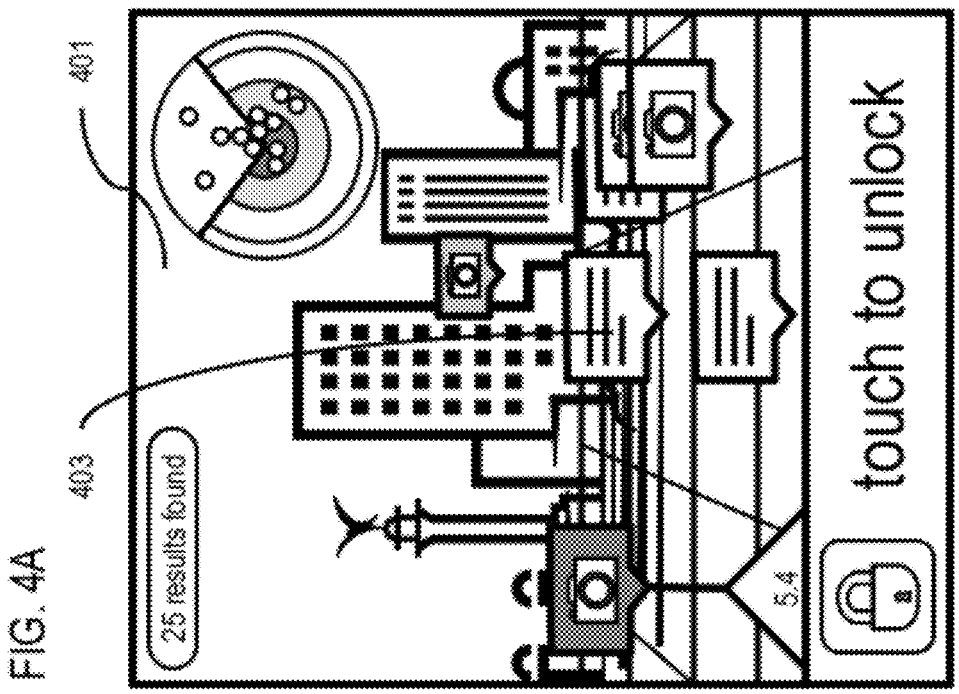

FIGS. 4A and 4B are diagrams of user interfaces utilized in the processes of FIG. 3, according to various embodiments. Each of the user interfaces illustrated in FIGS. 4A and 4B have functionality of particular applications when a device is locked. In FIG. 4A, the user interface 401 is for an augmented reality application. The user interface 401 illustrates a view of an area that may be detected and determined based on context information about the location of the UE 101. A camera that may be integrated into the UE 101 may be used to take a picture or illustrate a display of a view of the camera on the user interface 401. The augmented reality application, in this embodiment, is one that shows points of interest 403 around a location of the UE 101 that may be in a line of sight of the UE 101 when the UE 101 is facing a particular direction.

FIG. 4B is a diagram of a user interface 405 that, when the UE 101 is moved to an orientation that is different from the orientation shown in FIG. 4A (here the orientation moves from vertical to horizontal. When the orientation is changed, the view of the augmented reality changes. For example, in FIG. 4B the augmented reality application is still running on the UE 101, but the view changes to a different augmented reality layer. In other words, the layer that is depicted in user interface 405 may be a view of the inside of a building that is in the line of sight of the UE 101, or a selected point of interest 407. Alternatively, the change in orientation may switch between applications to another application, and continually twisting the UE 101 may be used to zoom in and out of a display.

Figure 5B:
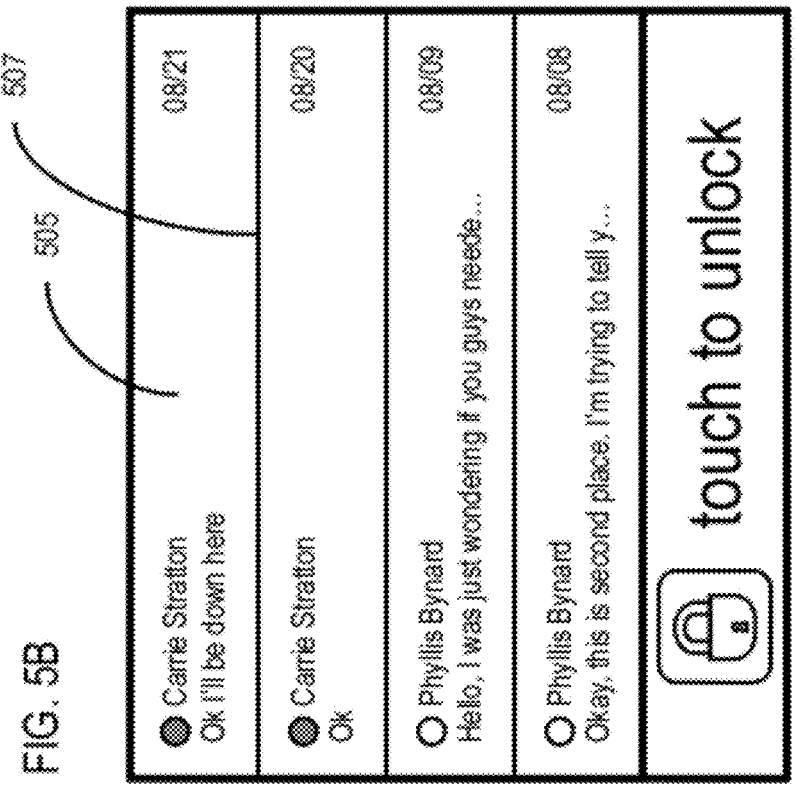
FIGS. 5A and 5B are diagrams of user interfaces utilized in the processes of FIG. 3, according to various embodiments.
Figure 5A:
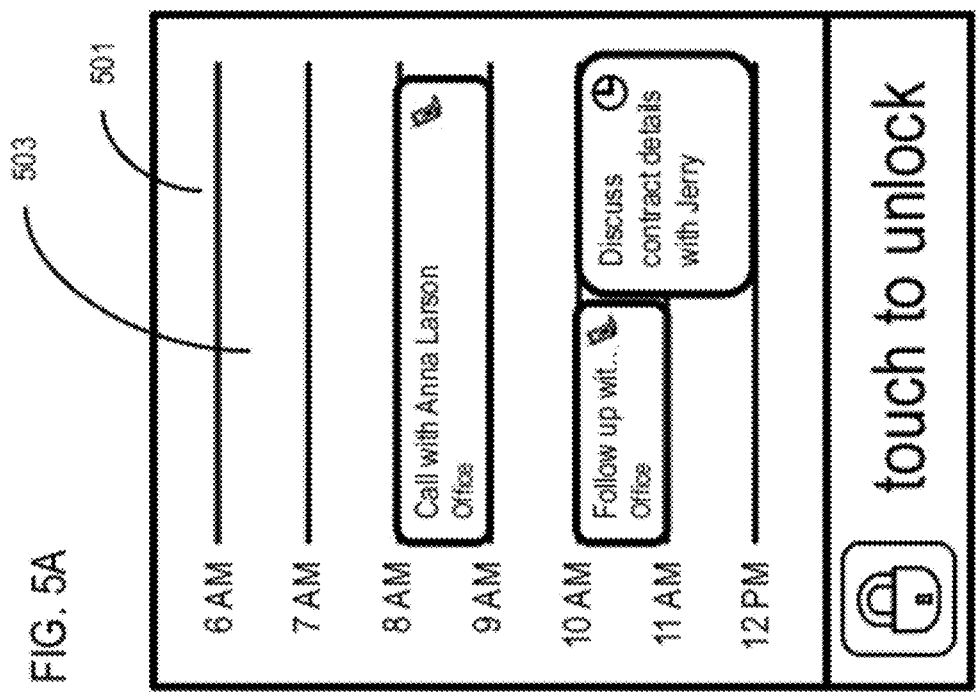

FIGS. 5A and 5B are diagrams of user interfaces utilized in the processes of FIG. 3, according to various embodiments. Each of the user interfaces illustrated in FIGS. 5A and 5B have functionality of particular applications when a device is locked. FIG. 5A illustrates a user interface that depicts a calendar 503 when the user interface 501 is oriented vertically. FIG. 5B illustrates a user interface 505 that depicts a message inbox 507 when the user interface 505 is illustrated horizontally. Changing the orientation of the user interface may switch between user interfaces for the same or related applications, such as a messaging application and calendar, but it may always cause a switch to occur between unrelated applications depending on a user preference for which applications may or may not be running while the device is in a locked state.

The processes described herein for increasing the functionality of an electronic device while the device is in a locked state may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
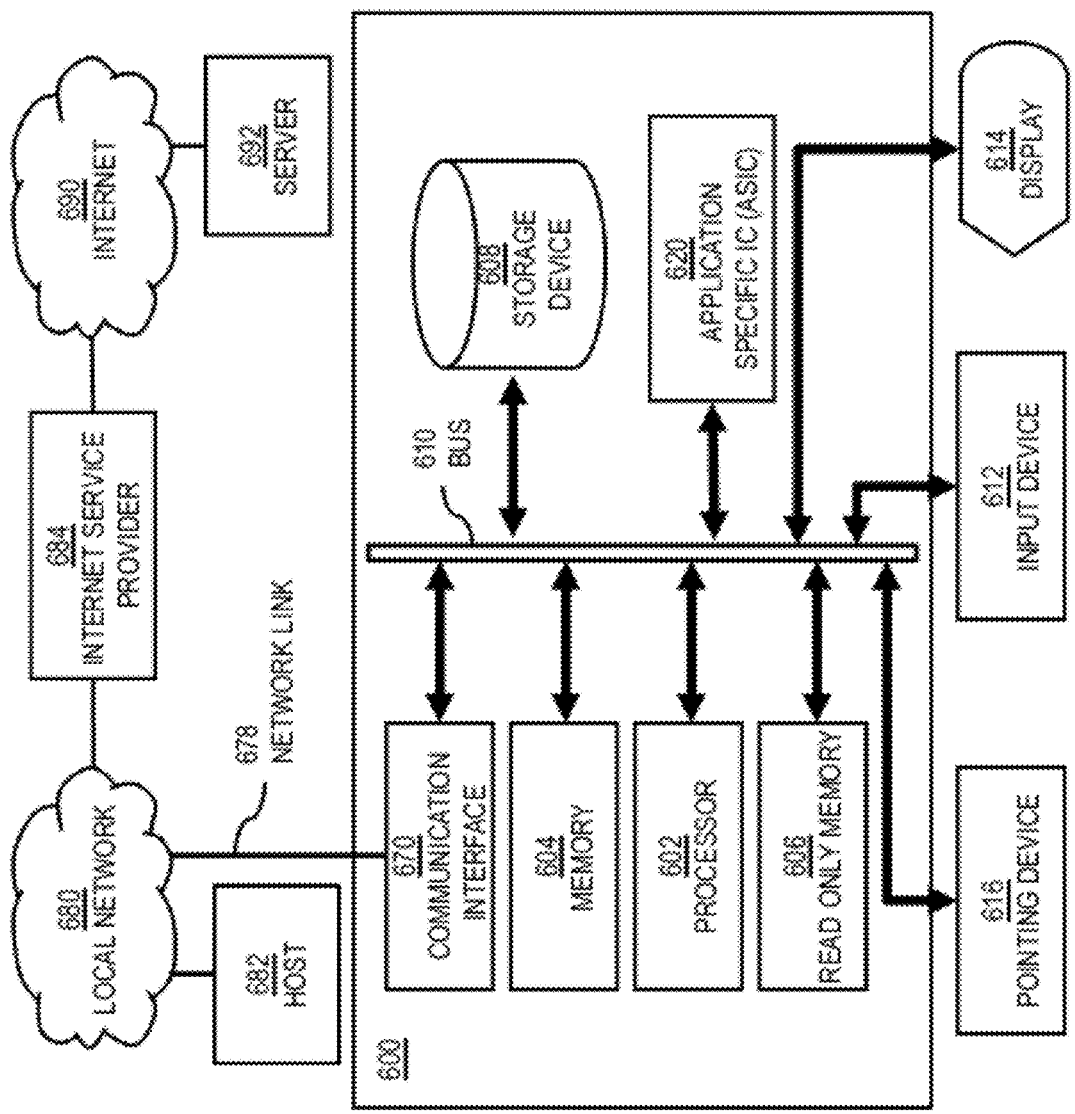
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to increase the functionality of an electronic device while the device is in a locked state as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of increasing the functionality of an electronic device while the device is in a locked state.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to increase the functionality of an electronic device while the device is in a locked state. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for increasing the functionality of an electronic device while the device is in a locked state. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for increasing the functionality of an electronic device while the device is in a locked state is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for increasing the functionality of an electronic device while the device is in a locked state to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to increase the functionality of an electronic device while the device is in a locked state as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of increasing the functionality of an electronic device while the device is in a locked state.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to increase the functionality of an electronic device while the device is in a locked state. The memory 705 also stores the data associated with or generated by the execution of the inventive steps.

Figure 8:
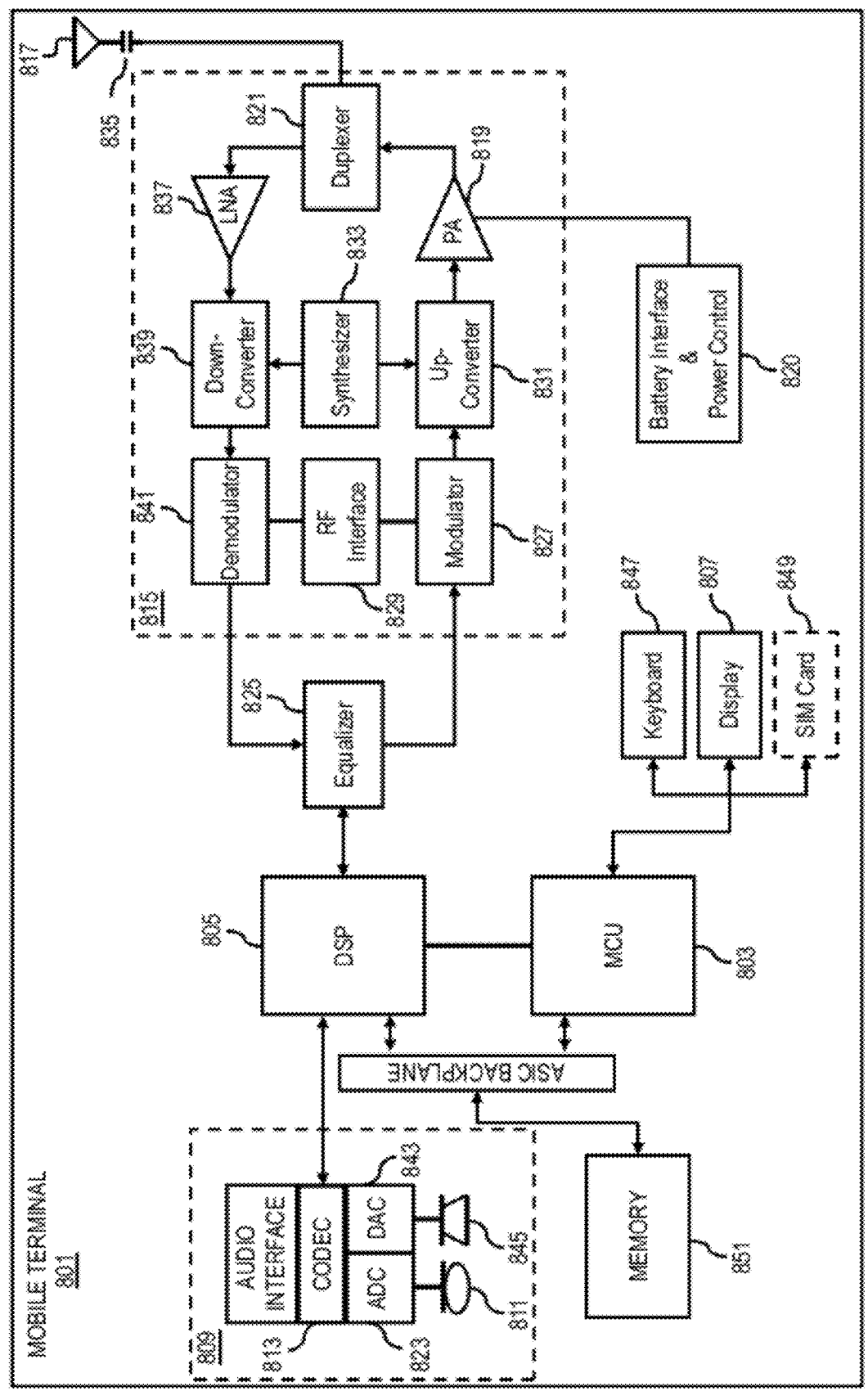
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of increasing the functionality of an electronic device while the device is in a locked state. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of increasing the functionality of an electronic device while the device is in a locked state. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to increase the functionality of an electronic device while the device is in a locked state. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   one or more applications for presentation at a device;
   a determination that the device is in a locked state;
   a processing of the one or more applications to cause, at least in part, presentation of the one or more applications in a user interface of the device associated with the locked state;
   a determination of one or more interactions at the device while the device is in the locked state,
   wherein the one or more interactions are one or more movements of the device;
   a processing of the one or more interactions to cause, at least in part, one or more manipulations of the one or more applications;
   a processing of the one or more interactions to select the one or more applications, one or more views of the one or more applications, or a combination thereof to present in the user interface; and
   a processing of the presentation of the one or more applications to cause, at least in part, a generation of a low-power user interface of the device associated with the locked state,
   wherein the generation of the low-power user interface comprises causing, at least in part, (a) a reduction of the complexity of one or more views of the one or more applications, (b) a deactivation of one or more components of the one or more applications, or (c) a combination thereof.

2. A method of claim 1, wherein the (1) data and/or (2) information and/or (3) at least one signal are further based, at least in part, on the following:
   a determination of the one or more interactions, the one or more movements, or a combination thereof by one or more sensors including, at least in part, a camera, an orientation sensor, a movement sensor, a location sensor, a proximity sensor, a light sensor, or a combination thereof.

3. A method of claim 1, wherein the one or more manipulations are performed while maintaining the locked state of the device.

4. A method of claim 1, wherein the (1) data and/or (2) information and/or (3) at least one signal are further based, at least in part, on the following:
   an input for actuating a switch associated with the device to cause, at least in part, initiation of the locked state, the presentation of the one or more applications in the user interface, or a combination thereof.

5. A method of claim 1, wherein the one or more applications comprises at least one location-based application, the at least one location-based application including, at least in part, an augmented reality application, a mixed reality application, a mapping application, a navigation application, or a combination thereof.

6. An apparatus comprising:
   at least one processor; and
   at least one memory including computer program code for one or more programs,
   the at least one memory and the computer program code configured to, with the at least one processor, cause the apparatus to perform at least the following,
   determine one or more applications for presentation at a device;
   determine that the device is in a locked state;
   process and/or facilitate a processing of the one or more applications to cause, at least in part, presentation of the one or more applications in a user interface of the device associated with the locked state;
   determine one or more interactions at the device while the device is in the locked state,
   wherein the one or more interactions are one or more movements of the device;
   process and/or facilitate a processing of the one or more interactions to cause, at least in part, one or more manipulations of the one or more applications;
   process and/or facilitate a processing of the one or more interactions to select the one or more applications, one or more views of the one or more applications, or a combination thereof to present in the user interface; and
   process and/or facilitate a processing of the presentation of the one or more applications to cause, at least in part, a generation of a low-power user interface of the device associated with the locked state,
   wherein the generation of the low-power user interface comprises causing, at least in part, (a) a reduction of the complexity of one or more views of the one or more applications, (b) a deactivation of one or more components of the one or more applications, or (c) a combination thereof.

7. An apparatus of claim 6, wherein the apparatus is further caused to:
   cause, at least in part, a determination of the one or more interactions, the one or more movements, or a combination thereof by one or more sensors including, at least in part, a camera, an orientation sensor, a movement sensor, a location sensor, a proximity sensor, a light sensor, or a combination thereof.

8. An apparatus of claim 6, wherein the one or more manipulations are performed while maintaining the locked state of the device.

9. An apparatus of claim 6, wherein the apparatus is further caused to:
   receive an input for actuating a switch associated with the device to cause, at least in part, initiation of the locked state, the presentation of the one or more applications in the user interface, or a combination thereof.

10. An apparatus of claim 6, wherein the one or more applications comprises at least one location-based application, the at least one location-based application including, at least in part, an augmented reality application, a mixed reality application, a mapping application, a navigation application, or a combination thereof.

11. A method of claim 1, wherein the one or more or more interactions include rotating the device to select the one or more applications to present in the user interface.

12. A method of claim 11, wherein the one or more applications are unrelated applications.

13. A method of claim 1, wherein the presentation of the one or more applications in a user interface includes one or more augmented-reality (AR) layers.

14. A method of claim 13, wherein the one or more interactions include rotating the device to select the one or more AR layers to present in the user interface.

15. A method of claim 13, wherein the one or more AR layers include a low-power mode which includes a wireframe view.

16. An apparatus of claim 6, wherein the one or more or more interactions include rotating the device to select the one or more applications to present in the user interface.

17. An apparatus of claim 16, wherein the one or more applications are unrelated applications.

18. An apparatus of claim 6, wherein the presentation of the one or more applications in a user interface includes one or more augmented-reality (AR) layers.

19. An apparatus of claim 18, wherein the one or more interactions include rotating the device to select the one or more AR layers to present in the user interface.

20. An apparatus of claim 18, wherein the one or more AR layers include a low-power mode which includes a wireframe view.

* * * * *